(12) United States Patent
Ohuchi

(10) Patent No.: US 7,777,693 B2
(45) Date of Patent: Aug. 17, 2010

(54) IMAGE OUTPUT APPARATUS HAVING A COMMUNICATION UNIT, AND CONTROL METHOD THEREOF

(75) Inventor: Masatomo Ohuchi, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 11/270,425

(22) Filed: Nov. 8, 2005

(65) Prior Publication Data

US 2006/0098174 A1 May 11, 2006

(30) Foreign Application Priority Data

Nov. 8, 2004 (JP) .............................. 2004-324078

(51) Int. Cl.
*G09G 5/00* (2006.01)
(52) U.S. Cl. ....................................... 345/2.2; 715/753
(58) Field of Classification Search .................. 345/84, 345/1.1–3.4; 715/750, 751, 753, 733
See application file for complete search history.

(56) References Cited

U.S. PATENT DOCUMENTS

| | | | | |
|---|---|---|---|---|
| 6,343,313 | B1 * | 1/2002 | Salesky et al. .............. | 709/204 |
| 6,989,801 | B2 * | 1/2006 | Bruning ...................... | 345/2.1 |
| 2003/0033805 | A1 | 2/2003 | LaViolette | |
| 2003/0145052 | A1 * | 7/2003 | Watanabe ................... | 709/204 |
| 2003/0189637 | A1 | 10/2003 | Nakade et al. | |
| 2004/0051744 | A1 * | 3/2004 | Fukui et al. ................. | 345/848 |
| 2004/0130502 | A1 * | 7/2004 | Sato et al. .................... | 345/2.1 |
| 2004/0140971 | A1 * | 7/2004 | Yamazaki et al. ........... | 345/204 |
| 2004/0150627 | A1 * | 8/2004 | Luman et al. ............... | 345/173 |
| 2004/0217946 | A1 * | 11/2004 | Hamano ...................... | 345/173 |
| 2005/0007444 | A1 * | 1/2005 | Yamazaki et al. .......... | 348/14.01 |

FOREIGN PATENT DOCUMENTS

| | | |
|---|---|---|
| JP | 57-153365 | 9/1982 |
| JP | 200-092466 | 3/2000 |
| JP | 2002-281468 | 9/2002 |
| JP | 2003-85112 | 3/2003 |
| JP | 2004-133354 | 4/2004 |
| JP | 2004-192464 | 7/2004 |

(Continued)

OTHER PUBLICATIONS

A European Search Report dated Mar. 30, 2006 for the corresponding European Patent Application No. 05024107.4-2414.

(Continued)

*Primary Examiner*—Chanh Nguyen
*Assistant Examiner*—Allison Walthall
(74) *Attorney, Agent, or Firm*—Cowan, Liebowitz & Latman, P.C.

(57) ABSTRACT

An image output apparatus has a communication unit which can communicate with a plurality of external devices, displays an image received from an external device through the communication unit, and acquires, from an external device serving as a provision source of the image being displayed, indication information related to sending of the image to an external device. The image output apparatus controls sending of the image being displayed to an external device other than the external device serving as the provision source on the basis of the acquired indication information.

4 Claims, 12 Drawing Sheets

FOREIGN PATENT DOCUMENTS

WO     03/025762     3/2003

OTHER PUBLICATIONS

An Office Action dated Aug. 3, 2007 from Japanese Patent Office for Japanese Patent Application No. 2004-324078 and English Translation of the same.

English Translation of JPA57-153365, Sep. 21, 1982.

English Translation of JPA2004-192464, Jul. 8, 2004.

Japanese Office Action dated May 11, 2007 from Japanese application No. 2004-324078.

* cited by examiner

| Index | IDENTIFIER (MAC / IP ADDRESS) | ASSOCIATION DATE AND TIME | IMAGE DISPLAYED LAST (FIRST) BY CORRESPONDING TERMINAL | AUTHENTICATION INFORMATION | PROJECTOR USE HISTORY (ORDER) | CURRENTLY BEING DISPLAYED |
|---|---|---|---|---|---|---|
| 1 | 00008500 0001 | 20040628 160100 |  | proper-a | 4 | ○ |
| 2 | 00008500 0002 | 20040628 160235 |  | proper-b | 1 | × |
| 3 | 00008500 0003 | 20040628 160215 |  | temporary-1 | 2 | × |
| 4 | 00008500 0004 | 20040628 160225 |  | temporary-2 | 3 | × |

FIG. 7

| Index | AUTHENTICATION INFORMATION | PROJECTOR USE HISTORY (ORDER) |
|---|---|---|
| 1 | proper-a | 4 |
| 2 | proper-b | 1 |
| 3 | temporary-1 | 2 |
| 4 | temporary-2 | 3 |

| Index | IMAGE DISPLAYED LAST (FIRST) BY CORRESPONDING TERMINAL | PROJECTOR USE HISTORY (ORDER) |
|---|---|---|
| 1 |  | 4 |
| 2 |  | 1 |
| 3 |  | 2 |
| 4 |  | 3 |

FIG. 10

| Index | AUTHENTICATION INFORMATION | PROJECTOR USE HISTORY (ORDER) | DELIVERY REQUEST |
|---|---|---|---|
| 1 | proper-a | 4 | |
| 2 | proper-b | 1 | ○ |
| 3 | temporary-1 | 2 | ○ |
| 4 | temporary-2 | 3 | |

| Index | IMAGE DISPLAYED LAST (FIRST) BY CORRESPONDING TERMINAL | PROJECTOR USE HISTORY (ORDER) | DELIVERY REQUEST |
|---|---|---|---|
| 1 |  | 4 | |
| 2 |  | 1 | ○ |
| 3 |  | 2 | ○ |
| 4 |  | 3 | |

IMAGE OUTPUT APPARATUS HAVING A COMMUNICATION UNIT, AND CONTROL METHOD THEREOF

FIELD OF THE INVENTION

The present invention relates to an image output apparatus and, more particularly, to a technique of image delivery to an external device using an image output apparatus, such as a projector, having a communication function and a display function to output screen data received from several external devices.

BACKGROUND OF THE INVENTION

Some projectors connect with a terminal over Ethernet (registered trademark) or by wireless communication instead of connecting with the terminal via a VGA cable. Some of these projectors allow a connected terminal to download image data being projected upon request. A conventional projector with a wireless communication function will be described below using FIG. 12. FIG. 12 depicts a parallel control relationships between a projector 1 and four terminals (terminals A to D). Note that the leftmost column shows the contents of an image being projected at that time by the projector for the purpose of the explanations.

When the projector is first activated, an application therein starts to project a setting menu onto a projector screen (step S1). A user sets the wireless connection parameters such as the SSID (Service Set ID) and establishes a wireless basic service set (IBSS: Independent Basic Service Set or BSS) (step S2). Note that the projector and each terminal are connected in ad hoc mode or infrastructure mode.

In the meantime, a user starts an application on the terminal A (step S3). The user of the terminal A designates the same SSID as the one of the projector and makes a connection request to the projector (step S4). In return, the projector sends a response which allows a connection (step S5). Upon this, screen data is sent out from the terminal A, and the screen data of the terminal A is projected onto the projector screen through the projector (step S6).

The terminal B follows the terminal A and performs the connection operations in the same manner. At this time, to control the projector, the following operations can be performed:

(1) the operation of switching to a mode of displaying only the screen data of the terminal B;
(2) the operation of switching to a multimode for simultaneously displaying the screen datas of the terminals A and B; and
(3) the operation of not allowing the terminal B to use the projector and continuously displaying the screen data of the terminal A.

Assume here that the projector is set to the multimode of simultaneously performing display of the terminals A and B. In response to a connection request from the terminal B (step S7), the projector 1 sends in return a response of permission (step S8). Since the projector 1 is set to the multimode, transmission of the screen data of the terminal A continues (step S9). The screen data of the terminal A is combined with that of the terminal B (step S10) to form and project one screen (multi-screen). As a method of forming a multi-screen at this time, the following methods are available:

a method of sending data of the entire screens from the terminals A and B, performing image processing in the projector, and forming a multi-screen; and a method of sending, via the terminals A and B, images with lower resolution for multi-screen display and combining the images at the projector to form a multi-screen.

Some of such projectors can temporarily store displayed screen data in their memories or download stored image data to a terminal. For example, if user a of the terminal A performs a screen holding operation using a remote control, the projector detects the operation and accumulates the image being displayed in a holding memory (step S11). After that, when the terminal A requests a download (step S51), data transfer starts (step S52).

In the above-described case, downloading stored image data is unlimitedly performed. More specifically, delivery destinations cannot be limited to specific terminals. Apart from this, there is also demand to set, for each terminal, whether download is permitted (e.g., the terminal B can download an image provided by the terminal A, but the terminal C is prohibited). In this case, one could consider as an arrangement in which if the terminal B requests downloading a screen data displayed by the terminal A, it is checked whether or not the terminal A gives permission to download the data to the terminal B. This arrangement requires the user of the terminal A to recognize that the request comes from the terminal B which has requested download.

Japanese Patent Laid-Open No. 2003-085112 describes means, in a system using a projector, by which the user of a terminal recognizes another terminal serving as a partner. Japanese Patent Laid-Open No. 2003-085112 describes, as the system using a projector, an arrangement which performs exclusive or cooperative remote control for a conferencing system using a plurality of terminals, automatic draw-up of the minutes, synchronization of video, audio, and still images, mirroring with a remote device, participation right control, and the like. According to Japanese Patent Laid-Open No. 2003-085112, pieces of pre-registered user information (photographs of faces, icons, and the like) are used as means by which the user of each terminal recognize a partner.

Japanese Patent Laid-Open No. 2002-281468 describes an arrangement which calculates the positional relationship among pieces of information equipment on the basis of the reception delay time of radio waves and visually shows the placement of the pieces of information equipment on a part of a common screen on the basis of the calculated positional relationship. According to Japanese Patent Laid-Open No. 2002-281468, an information terminal brought in by a participant is arranged as an icon on a virtual screen imitating an actual positional relationship, and a selected file is dragged and dropped onto the icon indicating the information terminal, thereby performing file transfer.

In the conventional examples, screen storage is performed by a storage operation of the projector (step S11), thereby allowing each terminal to download a screen data. This may bring about a situation where data is stored or delivered to an unspecified terminal regardless of the intention of the owner of the data.

In order to determine for each terminal whether to permit download as described above, a terminal serving as the provision source of an image needs to specify each terminal. Examples of a method of specifying a terminal include a method of registering in advance user information to the terminal and associating terminals with their users, as described in Japanese Patent Laid-Open No. 2003-085112. However, this method requires previous settings, and the operation is troublesome. Also, the method lacks flexibility and, for example, cannot cope very easily with a case where there is a change in participants in a conference. As means for specifying a terminal without such previous settings, there exists available a technique for specifying the position of a terminal using communication delay time, as described in Japanese Patent Laid-Open No. 2002-281468. However, if participants are close to each other, an error is likely to occur, and the technique lacks accuracy. Although there is another method of associating terminals with users by taking photographs of the faces of the users or the like with a camera provided and displaying the association, it costs a lot to equip all users with cameras.

SUMMARY OF THE INVENTION

The present invention has been made in consideration of the above-described problems, and has as its object to allow an image display apparatus comprising a communication function to make delivery of a displayed image with permission of the transmission source of the image and implement delivery of data in keeping with the intention of a data owner.

It is another object of the present invention to allow the provision source of an image to easily designate the delivery destination of the image.

According to one aspect of the present invention, there is provided an image output apparatus comprising: a communication unit capable of communicating with a plurality of external devices; a display control unit configured to display an image received from an external device through the communication unit; an acquisition unit configured to acquire, from an external device serving as a provision source of an image being displayed by the display control unit, indication information related to sending of the image being displayed to an external device; and a sending unit configured to control sending of the image being displayed by the display control unit to an external device other than the external device serving as the provision source on the basis of the indication information acquired by the acquisition unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a chart showing a display example of connection information in a terminal device;

FIG. 10 is a chart showing a display example, on a terminal having made a delivery request, of connection information including information about the terminal;

DETAILED DESCRIPTION OF THE PREFERRED EMBODIMENTS

Preferred embodiments of the present invention will now be described in detail in accordance with the accompanying drawings.

First Embodiment

A first embodiment will be explained on the basis of FIGS. 1 to 5.

Figure 1:
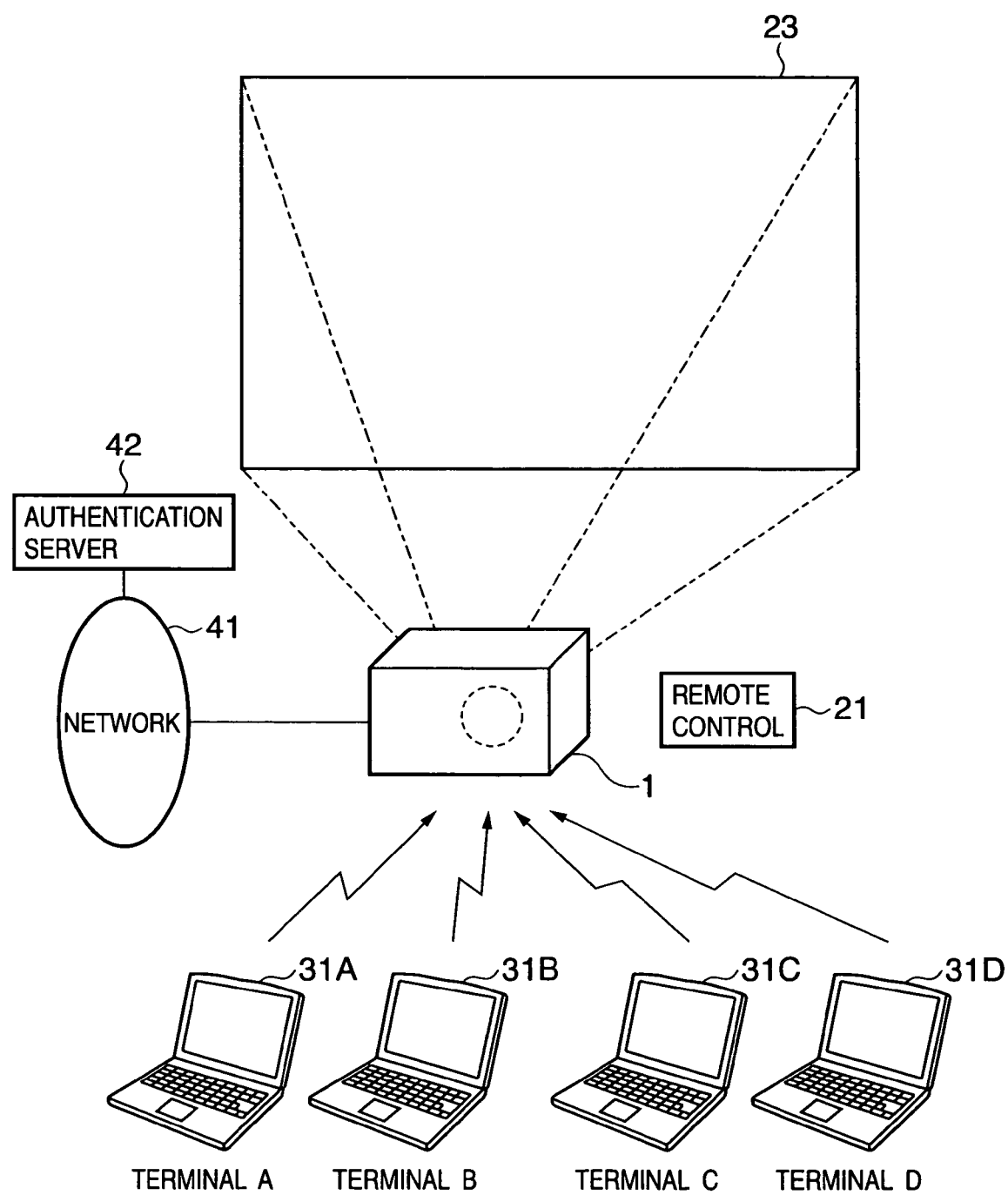
FIG. 1 is a view showing an example of the configuration of an image display system according to an embodiment.

FIG. 1 is a view showing an example of the configuration of an image display system according to this embodiment. A projector 1 receives image information from external terminal devices (terminals 31A to 31D in FIG. 1) and displays it on a projector screen 23. The projector 1 can be operated by a remote control 21. The projector 1 can communicate with an authentication server 42 over a network 41. Note that the authentication server 42 will be explained later in the third embodiment. The terminals 31A to 31D (to be generically referred to as terminal devices 31 hereinafter) can send data to be displayed to the projector 1 over a wireless LAN.

Figure 2:
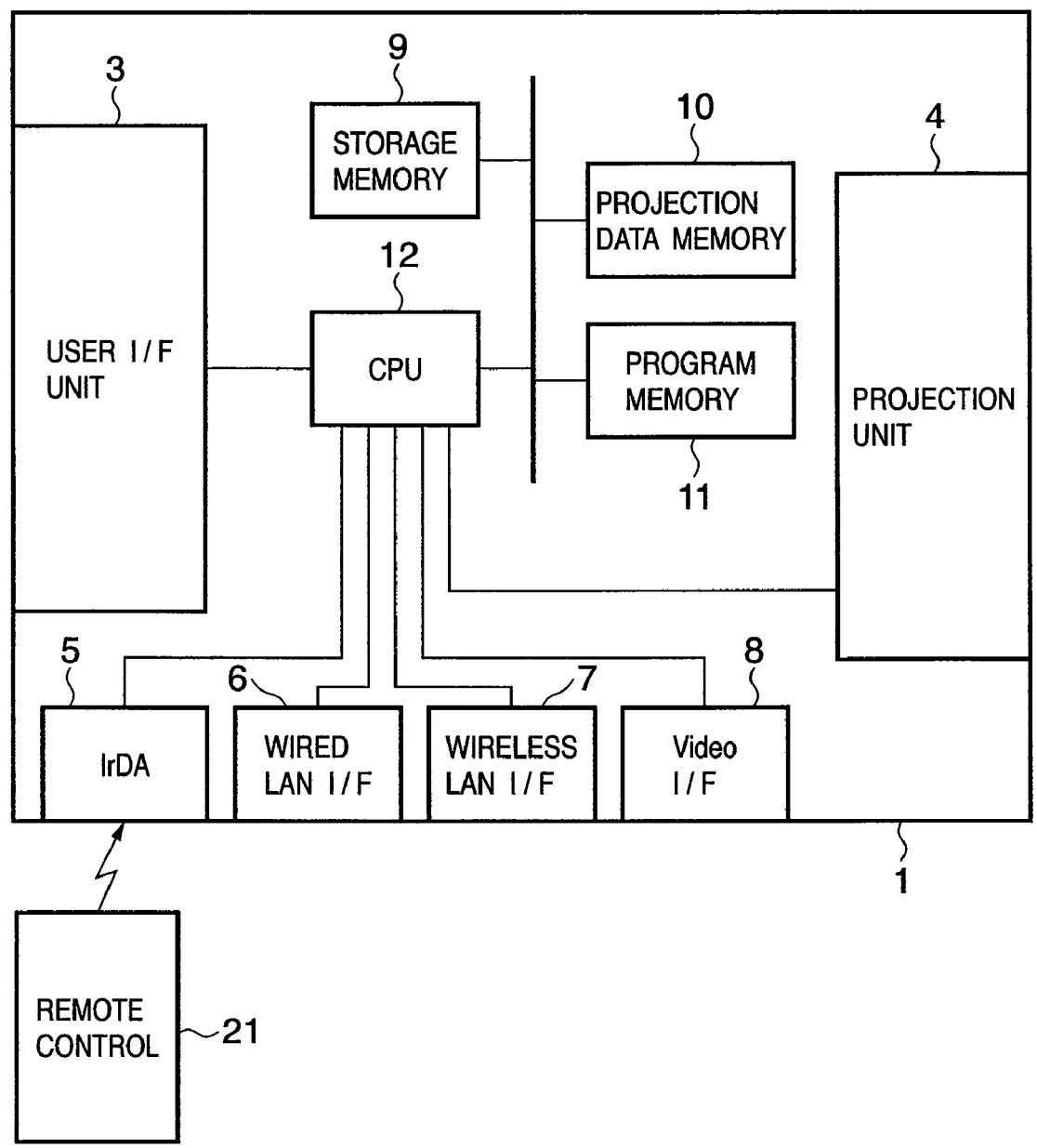
FIG. 2 is a block diagram showing an example of the configuration of a projector according to the embodiment.

FIG. 2 is a block diagram showing the configuration of the projector 1. In FIG. 2, a user I/F unit 3 includes an operation panel used by users to perform operation for the projector 1, and a keyboard, buttons, display unit, and the like are arranged on the operation panel. A projection unit 4 is composed of projector and condenser lenses, a lamp, a mirror, and the like. Examples of an optical system of the projection unit include ones of the types below. However, the type of the optical system is irrelevant to the essence of the present invention and is not limited to a specific one in this embodiment.

(1) 3LCD type
(2) DLP (registered trademark of Texas Instruments Incorporated) type
(3) LCOS (Liquid Crystal On Silicon) type An IrDA 5 is an infrared light-receiving unit for implementing an interface with the remote control 21 and uses IrDA (Infrared Data Association). A user can operate the projector 1 using the remote control 21. A wired LAN I/F 6 is an interface for connecting with a LAN over Ethernet (registered trademark) or the like. A wireless LAN I/F 7 is an interface for connecting with a wireless LAN such as IEEE802.11.

It is also possible to control the subnet of the wireless LAN I/F 7 and that of the wired LAN I/F so as to be different from each other. At this time, the projector 1 itself serves as a router. The projector 1 comprises a video I/F 8 and is capable of connecting with a terminal through a VGA cable. A storage memory 9 is a memory which holds screen data for download. A projection data memory 10 is a memory (video memory) for holding data currently being projected. A program memory 11 is a memory which stores software defining the operation of the projector 1. A CPU 12 implements various types of control by executing a program stored in the program memory 11.

Figure 3:
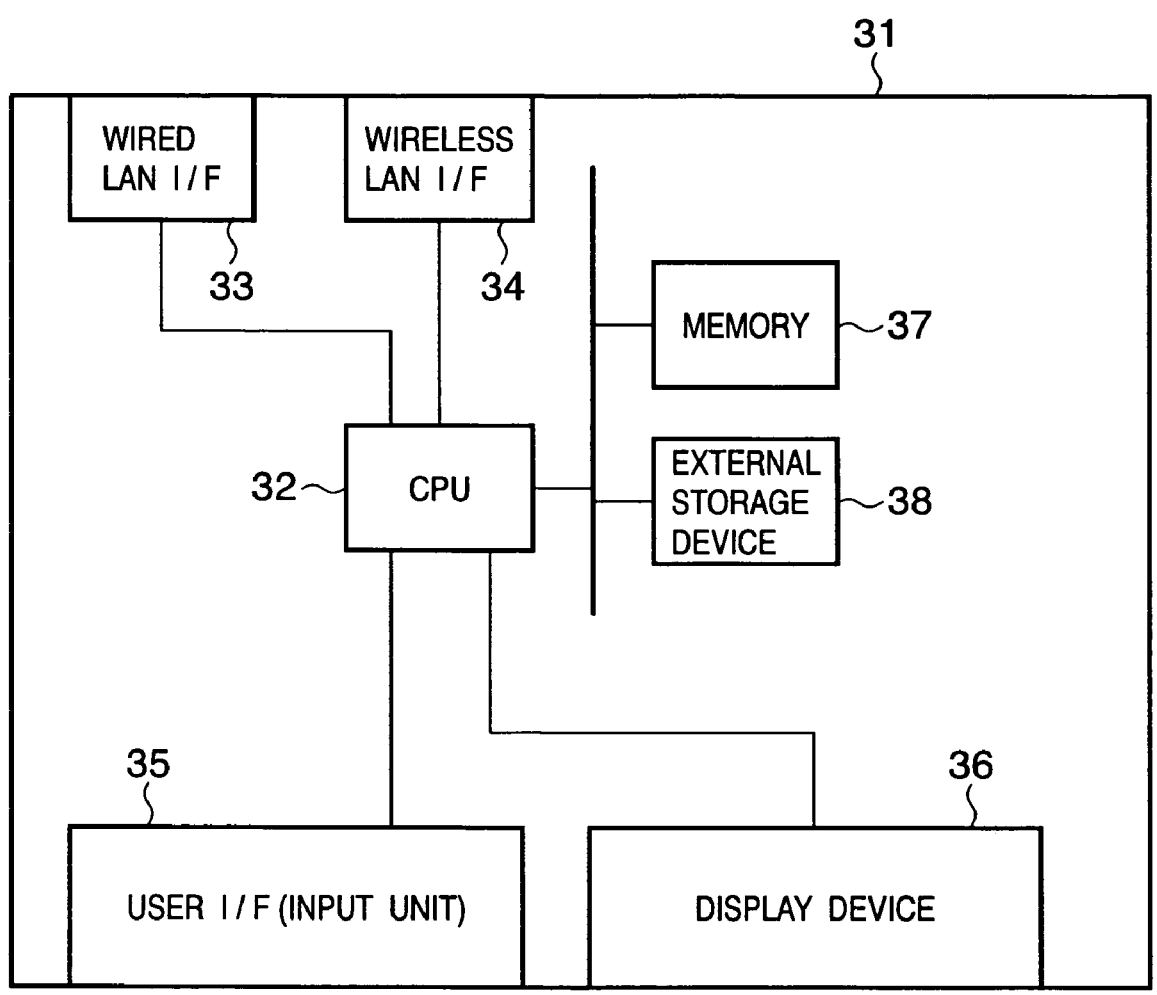
FIG. 3 is a block diagram showing an example of the configuration of a terminal device according to the embodiment.

FIG. 3 is a block diagram showing the configuration of each terminal device 31. A so-called personal computer can be used as the terminal device 31. A CPU 32 performs various types of control by executing a program stored in a memory 37. Note that the memory 37 includes a RAM and ROM and that a control program stored in an external storage device 38 is loaded into the memory 37 as needed upon execution of the control program. The external storage device 38 is composed of, e.g., a hard disk.

A wired LAN I/F 33 is an interface for connecting with a LAN over Ethernet (registered trademark) or the like. A wireless LAN I/F 34 is an interface for connecting with a wireless LAN such as IEEE802.11. A user I/F 35 is an interface for transmitting an operation input by a user to the CPU 32 and includes a keyboard and pointing device. A display device 36 performs various types of display processing under the control of the CPU 32 and is composed of a CRT, LCD, or the like.

The operation of the above-described configuration will be explained below.

Cases of sending from each terminal device 31 to the projector 1 are classified as a case of sending an RGB video signal or a case of performing image processing using JPEG or the like and sending each screen data as a file. This embodiment assumes the case of sending as a file. As for the operation of selecting a screen to be stored when a plurality of screens are projected, this embodiment allows a choice between a method of making a selection from a terminal sending out screen data and a method of making a selection by displaying on a projector screen from an operator console (or remote control) of the projector.

Figure 4:
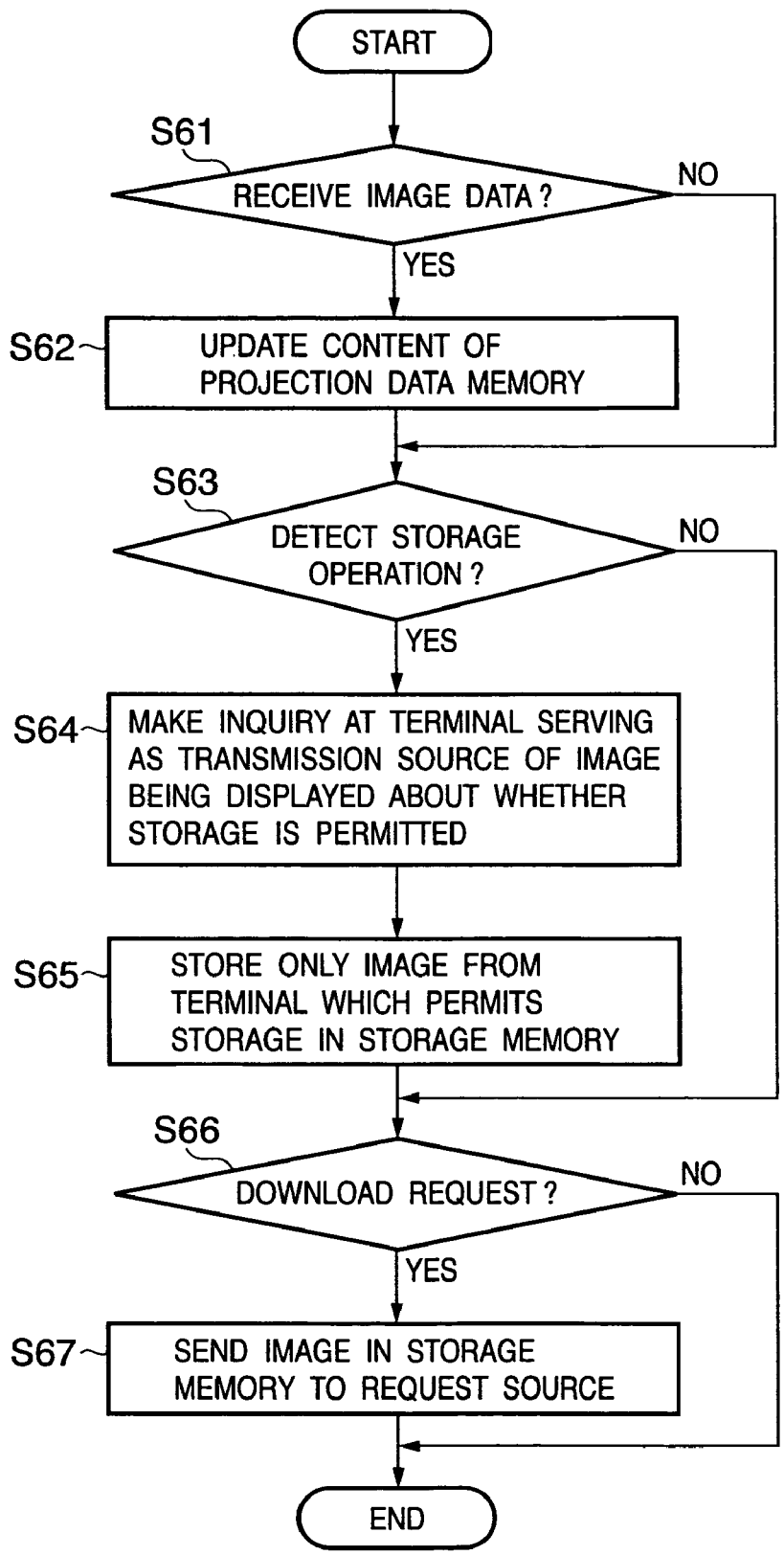
FIG. 4 is a flowchart for explaining the operation of the projector according to a first embodiment.
Figure 5:
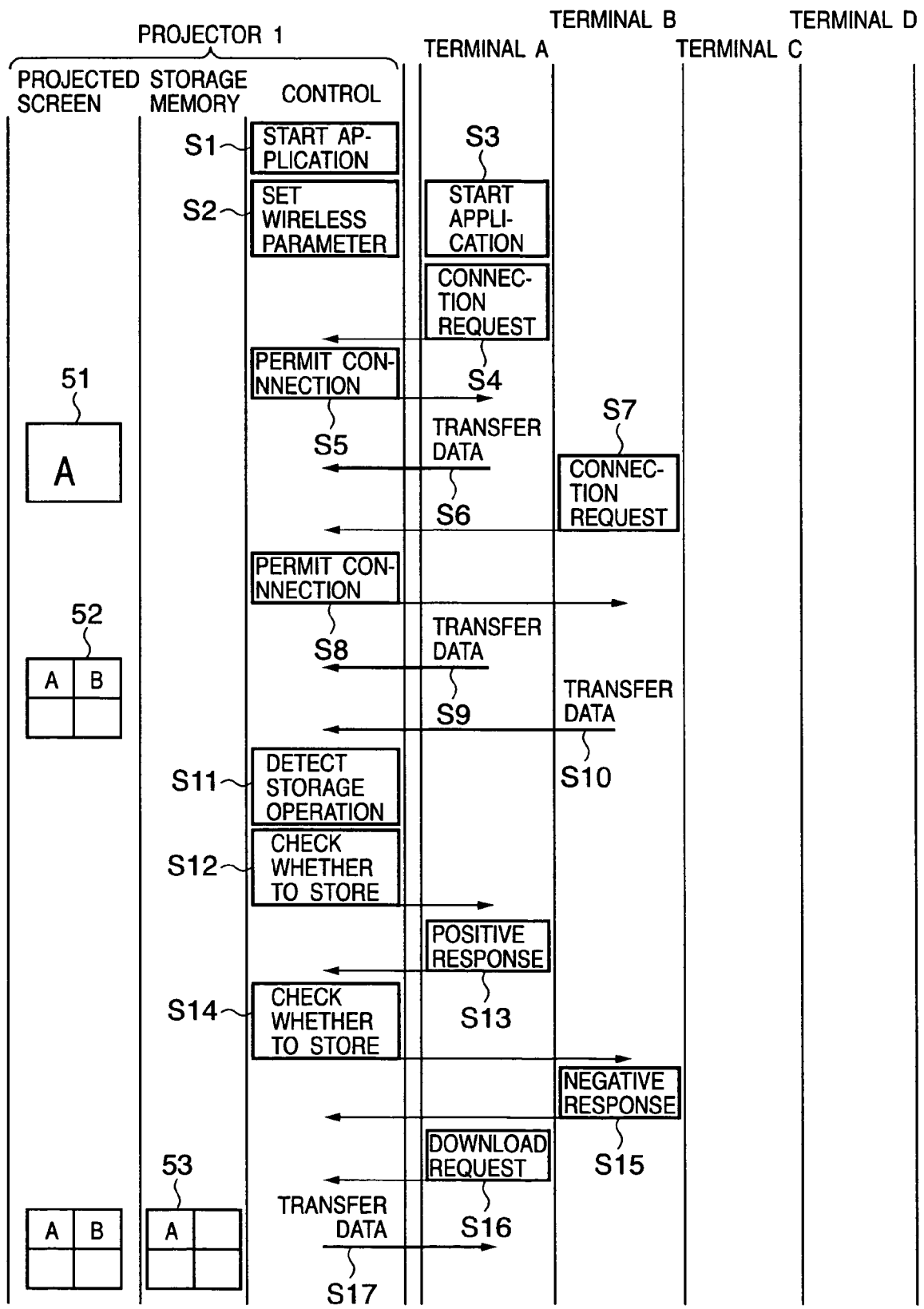
FIG. 5 is a chart for explaining the overall operation of the image display system according to the first embodiment.

The operation of storing a screen data and the operation of downloading a screen data to a terminal using the projector 1 according to the first embodiment will be explained with reference to a flowchart in FIG. 4. FIG. 5 shows an example of the procedure for a case where whether to store a screen data can be selected for each terminal. Note that in FIG. 5, terminals A, B, C, and D correspond to the terminals 31A to 31D, respectively.

First, when the projector 1 is activated, it determines whether some data is received from any of the terminals or the operation panel (remote control 21). In this embodiment, the projector 1 waits to receive image data from any of the terminals (step S61), detect storage operation performed by, e.g., operating the remote control (step S63), or receive a download request (step S66). The details of the procedure to reception of image data are as follows.

An application stored in the program memory 11 is executed by the CPU 12, and a setting menu is projected onto the projector screen (step S1). A user sets wireless parameters such as an SSID which is a network identifier, an encryption key, and a frequency channel and constructs a wireless basic service set (IBSS: Independent Basic Service Set or BSS) (step S2). Note that the projector and each terminal are connected over a wireless LAN in ad hoc mode or infrastructure mode.

In the meantime, a user starts an application on the terminal A (step S3). The user of the terminal A designates the same SSID as that of the projector and makes a connection request to the projector (step S4). The projector sends in return a response which permits connection (step S5). Upon this, image data to be displayed as a screen is sent out from the terminal A.

Upon receipt of the image data, the projector 1 updates the contents of the projection data memory 10 with the image data in step S62. As a result, the image sent from the terminal A is projected onto the projector screen by the projector (in step S6, a projected screen 51).

The terminal B follows the terminal A to perform connection operation in the same manner. At this time, as to the control of the projector 1 (updating and control of the projection data memory 10 in step S62), any of the following operations can be performed:

(1) the operation of switching to a mode of displaying only the screen data of the terminal B;
(2) the operation of switching to a multimode of simultaneously displaying the screen data of the terminals A and B; and
(3) the operation of not permitting the terminal B to use the projector and continuing to display the screen data of the terminal A.

Assume here that the projector 1 is set to the multimode (setting (2)) of simultaneously displaying screen data from the terminals A and B. In response to a connection request from the terminal B (step S7), the projector 1 sends a response of permission (step S8). Since the projector 1 is set to the multimode, transmission of the screen data of the terminal A is continuing (step S9). The screen data of the terminal A is combined with that of the terminal B (step S10) to form one screen (multi-screen) and project it onto the projector screen 23 (projected screen 52). As a method at this time, for example, there are available the following methods:

a method of sending, by the terminal A and terminal B, data of the entire screens, performing image processing in the projector 1, and forming and displaying a multi-screen; and a method of sending, by the terminals A and B, data of screens with lower resolutions for a multi-screen and combining the images by the projector to form and display a multi-screen.

The projector 1 is configured to be capable of temporarily storing displayed screen data in its memory and downloading the stored image data to each terminal. For example, when a user a of the terminal A performs screen holding operation using the remote control 21, the projector 1 detects the operation. The process advances from step S63 to step S64. In step S64, an inquiry is made at the terminals serving as the transmission sources of images being displayed about whether corresponding pieces of image information may be stored. In step S65, only the image originating from one of the terminals, having permitted storage of a corresponding piece of image information, is stored in the storage memory 9. If a download request is received from any of the terminals, the projector 1 sends the image stored in the storage memory 9 to the terminal having issued the download request (steps S66 and S67). More specifically, if the terminal providing the image data permits to store image data, another terminal is permitted to download the image data.

The above-described operations will be explained more specifically with reference to FIG. 5. For example, if the screen storage operation is performed while displaying a multi-screen of images from the terminals A and B (step S11), the projector 1 checks with the terminal A whether screen information may be stored (step S12). Assume that the terminal A sends in return a positive response (step S13). The projector 1 then checks with the terminal B whether screen information may be stored (step S14). Assume here that the terminal B sends in return a negative response (step S15). The projected screen is a multi-screen for the terminals A and B, and a stored screen 53 to be stored in the storage memory 9 only includes the terminal A.

For example, when the terminal A requests download (step S16), transfer of data stored in the storage memory 9 starts (step S17). Note that the terminal B can also request download and that the terminals C and D can also request download if they have established connection.

An image from each terminal may be stored in the storage memory not as a multi-screen but as one screen. In this case, if both the terminals A and B permit storage, the image data of two screens is stored in the storage memory. If a download request is made in this state, the image data of two screens may be downloaded. Alternatively, which screen data to download may be designated at the time of the download request, and the image data of the designated screen may be downloaded.

Control in this embodiment can be performed for an arbitrary number of display terminals (e.g., one or more than two terminals) as long as memory constraints allow. This embodiment shows the case of a system which has up to four terminals. The memory constraints are constraints on the capacity of a memory which holds an image file (or data) sent from simultaneously connected terminals. Even when a terminal is connected to the projector 1, the screen data of the terminal is not always projected by the projector. However, since it is necessary to switch a screen data to be projected from one to another by just pressing one button, the projector 1 needs to receive and hold a screen file (or data). The projector 1 can also be configured to select whether to store with each change in displayed screen even without any explicit operation using a remote control or the like. Additionally, the projector 1 can be configured to continue storing screens until the connection ends once it operates to store a screen.

As described above, according to the first embodiment, when the operation of storing screen datas is performed in the projector, an inquiry is made at the owner of each of the screens about whether storage is permitted. This has the effect that even when the screens of a plurality of users are displayed, each of the users can determine whether to store its screen.

Second Embodiment

In the first embodiment, a determination by a separate terminal whether storage is permitted is reflected in its screens. However, it is also possible to collectively control whether to store all of the screens. In this case, there can be considered controls below.
(1) If one or more terminals permit screen storage, all the screens are stored.
(2) If one or more terminals do not permit screen storage, no screen is stored.
(3) Whether to store all the screens is determined on the basis of which is larger, the number of terminals which permit storage of all the screens or that of terminals which do not permit the storage. If the numbers are equal, all the screens are stored.
(4) Whether to store all the screens is determined on the basis of which is larger, the number of terminals which permit storage of all the screens or that of terminals which do not permit the storage. If the numbers are equal, no screen is stored.
(5) Whether to store all the screens is determined according to a determination by a specific terminal. Note that the specific terminal is a terminal designated in advance as a chairperson terminal or administrative terminal or one connected Kth (first, last, or the like).

Third Embodiment

The first and second embodiments have explained arrangements in terms of whether to store screens and have shown the modes in which an arbitrary terminal can acquire a stored screen without limit. More specifically, a terminal providing an image can designate whether to permit downloading of the image but cannot limit terminals serving as download destinations to specific ones. The third embodiment allows controlling for each terminal whether to permit downloading of a stored screen.

First, a simple case will be shown where only the terminal A is displaying. The case is premised on the use environment below. A projector 1 is installed in a conference room of a certain company, also operates as an access point, and connects with an authentication server 42 on an in-house network 41 through a wired LAN I/F 6. Also, the IEEE802.11x Authenticator function is enabled. Users of the terminals A, B, C, and D are a, b, c, and d, respectively. The users have accounts of proper-a, proper-b, temporary-1, and temporary-2, respectively, on the authentication server 42. A character string "proper" in an account name represents a full-time worker of the company while a character string "temporary" in an account represents that the account is a temporary one for a conference. The users a, b, c, and d have gathered to hold a conference using the projector. When each terminal connects with the projector, an authentication procedure using a corresponding account name is performed.

Figure 6:
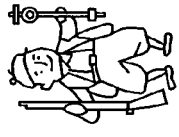
FIG. 6 is a chart showing an example of connection information held in a projector.
Figure 6:
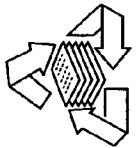
Figure 6:
Figure 6:
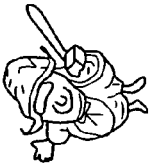

Assume that the projector 1 holds connection information as shown in FIG. 6. The pieces of information in the fields of FIG. 6 will be explained. First, when each terminal is to connect with the projector, its MAC address or IP address is acquired from an IEEE802.11 frame and is used as an identifier. The association time of the IEEE802.11 procedure is also recorded. If the IEEE802.1x procedure is enabled, authentication information is associated and held. Note that authentication information is acquired from the authentication server 42.

If the terminal uses the projector function, use order histories are updated. The histories are updated each time a terminal which uses the projector function is changed to another one. Each history shows what number the corresponding terminal used the projector. The use of the projector by a terminal means that the terminal transfers an image to the projector to make it display the image. Accordingly, "none" is recorded as the projector use history for a terminal which is just connected to and has not yet used the projector 1. The use histories are updated each time a terminal which is different from that of the last time uses the projector. For example, in FIG. 6, if proper-b uses the projector 1 again, the projector use histories are 3, 4, 1, and 2 in ascending order of Index (1 to 4). Information about whether a corresponding screen data is currently displayed is further held. If storage of screen information is permitted, information of an arbitrary one (e.g., the first or last) of the screens of a terminal is recorded as, e.g., a thumbnail image. Since a reduced image such as a thumbnail image (to be referred to as a thumbnail or reduced image hereinafter) has a smaller amount of information than screen information, recording of a reduced image may be performed regardless of whether storage of screen information is permitted. As for a terminal which does not permit storage of screen information or one which has not used the projector 1, a field for screen information is left blank. If last screens are to be registered, and proper-b uses the projector 1 again in the state of FIG. 6, an image held in a corresponding field of this type is updated.

In the example in FIG. 6, the users b, c, and d have already ended their presentations (material explanation) using the projector, and the user a is now giving a presentation using the terminal A. Storage of screen datas of the terminal A to the projector is permitted. Assume that the user b requests delivery of a screen from the user a.

With cooperation between an application in each terminal and that in the projector, a screen data held by the projector can be transferred by designating the screen data and a destination. Accordingly, the user a only needs to designate the terminal B of the user b and transfer the file. However, the user a is unable to know the address of the terminal B in this state.

For this reason, the user a requests display of connection information from the projector 1 by operating the terminal A. Upon this, necessary information is selected from the connection information in FIG. 6 depending on circumstances, and the information is displayed on the display screen of the terminal A having requested display of the connection information or displayed on a screen of the projector. The details are as described below.

FIG. 7 is a chart showing an example of the configuration of information to be displayed on the terminal having requested display of the connection information.
1. Authentication information: If a terminal having requested delivery is proper, authentication information is included. On the other hand, if the terminal is temporary, no authentication information is included. This derives from consideration given to prevent an account name which may include secret information from being known to anyone else except employees.
2. Thumbnail (or reduced screen data): Not included.
3. Projector use order: Included. This is based on a determination that what number each person gave a presentation is not secret information to those present.

Figure 8:
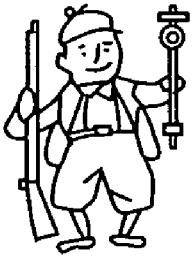
FIG. 8 is a chart showing a display example of connection information to be projected and displayed by the projector.
Figure 8:
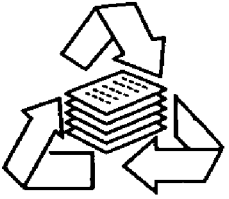
Figure 8:
Figure 8:
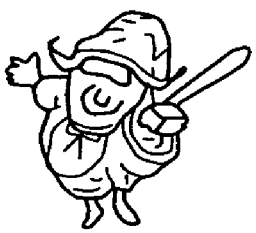

FIG. 8 is a chart showing an example of the configuration of information to be projected and displayed on a projector screen by the projector.
1. Authentication information: Not displayed. This means that authentication information is not displayed on the projector screen which anyone can view, in consideration of a case where each account contains secret information. However, control such as displaying authentication information only if all connectors are proper users may be allowed.
2. Thumbnail (or reduced screen data): Always displayed or displayed only if hold of screen is permitted.
3. Projector use order information: Displayed.

With reference to the above-described displays, the user a designates, for the projector 1, the index value of a terminal (user) for which delivery of an image from the terminal A is permitted. The projector 1 refers to the "Index" field of held information as in FIG. 6, acquires a corresponding MAC or IP address, and sends an image to the designated terminal. As described above, since connection information includes information about the use of the projector 1, each user can easily specify the terminal on the basis of the use state of the projector by others (displayed images and order in which the projector is used by the others). Note that the configurations of the connection information are merely examples, and the present invention is not limited to these. For example, a thumbnail may be included in information to be sent to a terminal having requested delivery operation.

In the above explanation, the user b requests delivery of a screen data from the user a by word of mouth, this request makes the user a from the terminal A request acquisition of connection information from the projector 1, and the projector 1 outputs the connection information in response to this. The procedure for outputting connection information by the projector 1 of this embodiment is not limited to this. It is also possible to output connection information by operation from a terminal requesting screen data delivery. More specifically, the projector 1 recognizes a terminal having requested download, and outputs connection information to the download request destination or displays the connection information on the projector screen.

Figure 9:
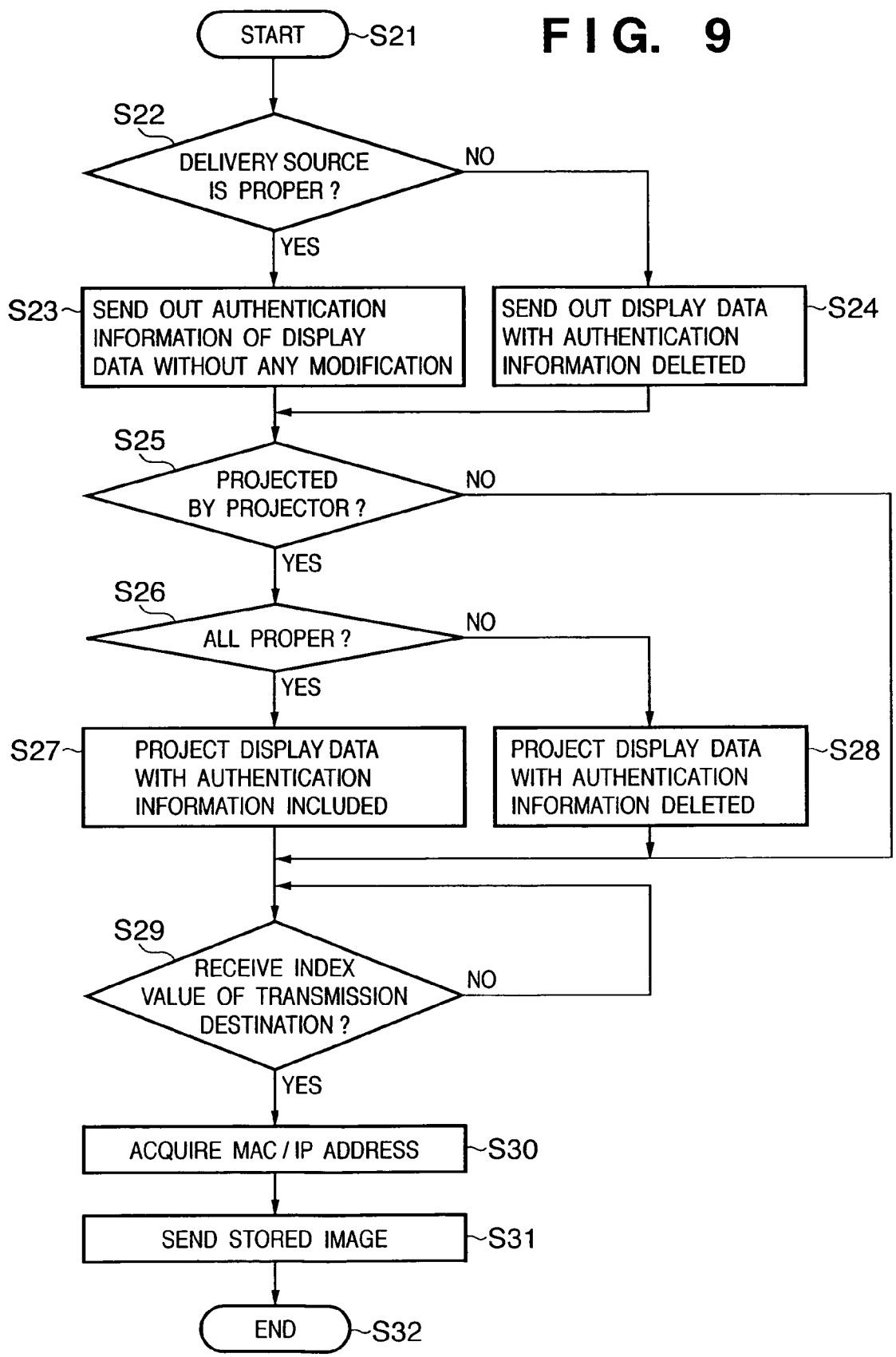
FIG. 9 is a flowchart for explaining the operation of the projector according to a third embodiment.

This control is shown as a flowcharted in FIG. 9. FIG. 9 is a flowchart showing the process for download control by the projector 1. For example, if the projector 1 recognizes that any of the terminals B to D makes a delivery request, it starts the processes from step S21.

In step S22, who is the owner of screen data currently being displayed is acquired from the information shown in FIG. 6. If the owner of the screen data is proper (full-time worker), the flow advances from step S22 to step S23 to send authentication information, a projector use history, and information about the terminal having requested delivery to the terminal A, which is the owner of the screen data. More specifically, connection information with the configuration as shown in FIG. 10 is sent to the terminal A. The configuration in FIG. 10 is obtained by adding information indicating a terminal having made a "delivery request" to the information shown in FIG. 7. In this example, the terminals B and C each have issued a screen data delivery request. On the other hand, if the owner of the screen data is not proper, the flow advances from step S22 to step S24 to send information of the delivery request without authentication information to the terminal A.

Figure 11:
FIG. 11 is a chart showing a display example of the connection information, including the information about the terminal having made the delivery request, to be projected and displayed by the projector.
Figure 11:
Figure 11:
Figure 11:
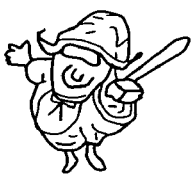
Figure 12:
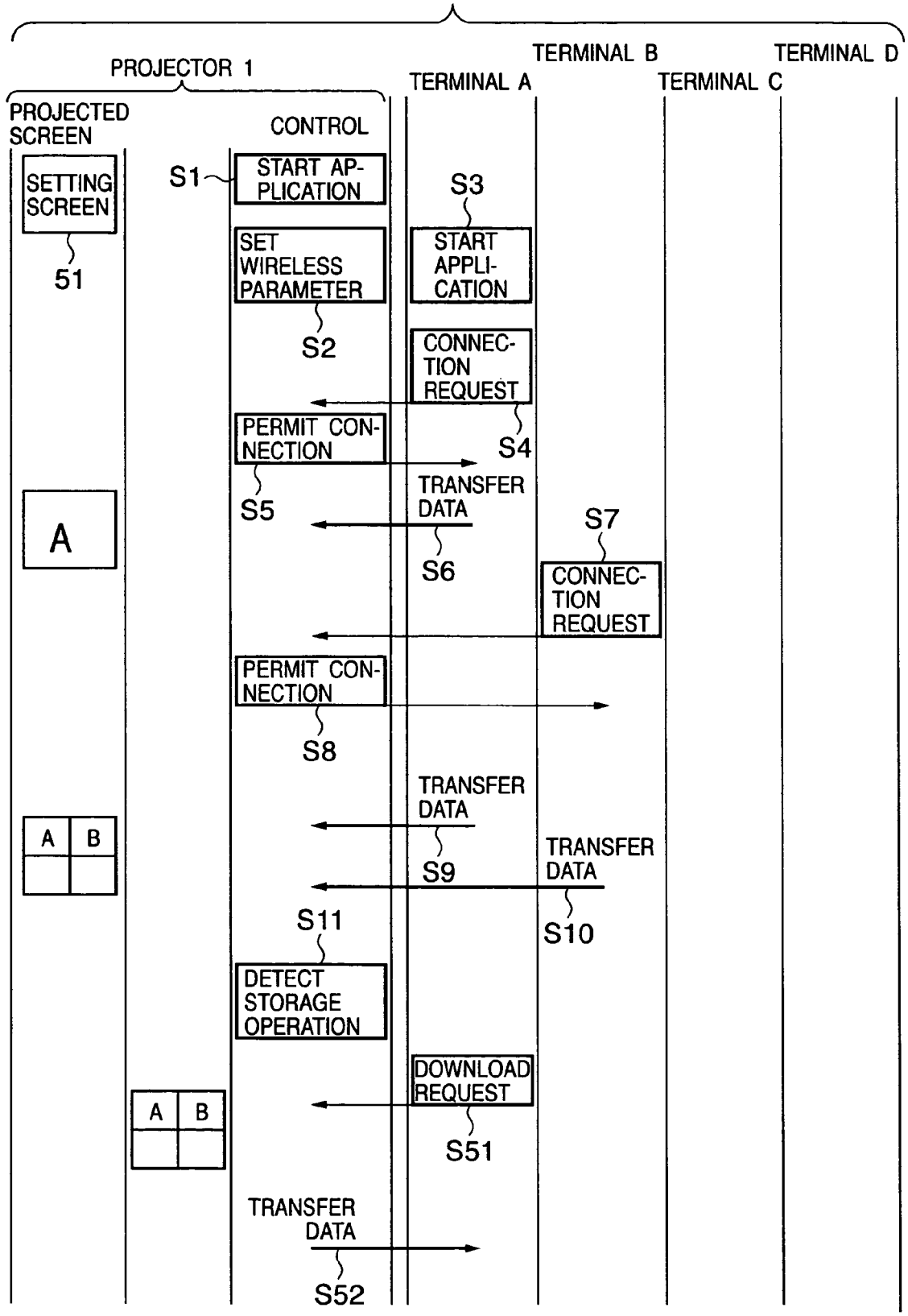
FIG. 12 is a chart for explaining the procedures for screen storage and download in a conventional projector.

In step S25, it is determined whether a setting is made such that an occurrence of a delivery request is projected onto a projector screen 22. If the setting is so made as to project an occurrence, the flow advances to step S26 to determine whether all users are proper. If all the users are proper, the flow advances to step S27 to project connection information with authentication information included from the projector. On the other hand, if there is any user that is not proper, the flow advances to step S28. In step S28, the screen data, projector history, and information of the delivery request with the authentication information not included are projected from the projector. The connection information at this time is as shown in FIG. 11. The configuration in FIG. 11 is obtained by adding information indicating a terminal having made a "delivery request" to the configuration in FIG. 8.

If the owner of the screen data (in this case, the terminal A) designates, for the projector 1, the index values of the terminals B and C having made the delivery requests after the above-described processing, the flow advances from step S29 to step S30. In steps S31 and S32, the screen data is downloaded to the terminals with the designated index values. More specifically, the index values designated by the terminal A are sent to the projector 1. Upon receipt of the index values, the projector 1 acquires MAC addresses or IP addresses corresponding to the received index values from the held information as in FIG. 6 (steps S29 and S30). An image held in a storage memory 9 is sent to the terminals with the acquired addresses. The user a can also designate, e.g., only the terminal B of the user b of the two users requesting delivery and let the projector download the image to the terminal B. The delivery operation in the terminal A only requires presenting a predetermined user interface through which the index value of a delivery destination can be input, inputting the index value of the terminal for which delivery is permitted, and giving a delivery instruction to the projector. Note that the user interface may allow simultaneous designation of a plurality of index values.

As described above, information of projector use order is included both in a terminal serving as a delivery source and in the projector screen. Accordingly, if one remembers what number the user b is, he/she can designate the terminal B. If one remembers any of the screens in the presentation of the user b (e.g., if one remember that the user b gave a presentation on recycling), he/she can also designate the terminal B using a thumbnail (or reduced screen).

The third embodiment has explained the arrangement in which image data held in the storage memory of the projector is sent. Alternatively, the present invention can be arranged such that, for example, data is sent from the terminal A to the terminal B upon a delivery request from the terminal B. In this case, the terminal A sends an index value and data to the projector 1, and the projector 1 operates to acquire the address value of the transmission destination from the index value and send the data received from the terminal A to the acquired address. Note that the data sent from the terminal A is not displayed on the screen.

If authentication information is used, the user a can know that the terminal with the account of proper-b belongs to the user b by viewing the authentication information. Although use order or a thumbnail of a screen is information which is not formed unless a corresponding terminal uses the projector before, authentication information can be acquired only if the terminal performs wireless communication procedures. Thus, authentication information can be used as effective measures, e.g., during a conference.

As described above, according to the third embodiment, when a request for delivery of a displayed screen is made, information about the terminal of a user having made the request is displayed to the user of the terminal serving as the transmission source of the screen data. For this reason, the user of the transmission source can specify the delivery destination even if he/she does not know the address of the user terminal having made the request. As described above, it becomes possible to easily select the delivery destination of an image from the provision source of the image. This makes it possible to implement screen storage and delivery according to the circumstances of each user and improve the confidentiality of information. It is particularly possible to specify an external device serving as an image delivery destination using information after connection without setting in advance user information, thereby improving the operability.

The above explanation has assumed a wireless LAN as communication means. However, a wired LAN can also implement the same control.

The present invention may be achieved by supplying a software program (in the above-described embodiments, a program corresponding to the flowcharts shown in the drawings) which implements the functions of the embodiments to a system or apparatus directly or from a remote location and causing a computer of the system or apparatus to read out and execute the supplied program code.

Accordingly, a program code itself, which is installed in a computer to implement the functional processing of the present invention by the computer, also implements the present invention. That is, a computer program itself for implementing the functional processing of the present invention, is also included in the present invention.

In this case, the program may take any form such as an object code, a program to be executed by an interpreter, or script data to be supplied to an OS as long as it functions like it should.

Examples of a recording medium for supplying a program are a floppy (registered trademark) disk, hard disk, optical disk, magneto-optical disk, MO, CD-ROM, CD-R, CD-RW, magnetic tape, nonvolatile memory card, ROM, DVD (DVD-ROM or DVD-R), and the like.

As another program supply method, a client computer can be connected to a homepage on the Internet using a browser of the client computer, and a computer program itself of the present invention or a compressed file containing an auto-install function can be downloaded from the homepage to a recording medium such as a hard disk. The supply of a program of the present invention can also be implemented by dividing a program code which constitutes the program into a plurality of files and downloading the files from different homepages. That is, a WWW server which causes a plurality of users to download a program file for causing a computer to implement the functional processing of the present invention is also included in the present invention.

Alternatively, the supply of a program of the present invention can be implemented by the following operations. More specifically, the program is encrypted, stored in a storage medium such as a CD-ROM, and delivered to users. Users who satisfy predetermined conditions are allowed to download key information for decryption from a homepage over the Internet. The users are allowed to execute the encrypted program using the key information and install the program in their computers.

The functions of the above-described embodiments can be implemented not only when a readout program is executed by a computer but also when an OS or the like which is running on the computer performs part or all of actual processing on the basis of the instructions of the program.

The functions of the above-described embodiments are also implemented when a program read out from a storage medium is written in a memory of a function expansion board inserted into a computer or a function expansion unit connected to the computer, and then a CPU or the like of the function expansion board or function expansion unit performs part or all of actual processing on the basis of the instructions of the program.

According to the present invention, an image display apparatus comprising a communication function is allowed to make delivery of a displayed image with permission of the transmission source of the image and implement delivery of data in keeping with the intention of a data owner.

Also, according to another aspect of the present invention, it becomes possible to allow the provision source of an image to easily designate the delivery destination of the image.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-324078 filed on Nov. 8, 2004, which is hereby incorporated by reference herein.

What is claimed is:

1. An image output apparatus comprising:
a communication unit configured to communicate with a plurality of external apparatuses via a network;
an output unit configured to output at least one received image for displaying, which has been received from one of said external apparatuses that is connected to said image output apparatus via the communication unit;
a holding unit configured to hold the received image in a memory;
a sending unit configured to send the received image to another said external apparatus via the communication unit; and
a determining unit configured to inquire the external apparatus which provided the received image, for whether or not the received image is allowed to be stored in the memory so as to provide the received image to said another external apparatus, and determine whether or not the received image is allowed to be held in the memory by the holding unit based on a response to the inquiry, wherein the output unit outputs a plurality of received images from the plurality of external apparatuses as a single screen image, the single screen image includes a received image that was not allowed by said determination unit to be held in the memory;

the holding unit, even when the output unit displays received images from the external apparatuses as the single screen image, holds in the memory the single screen image from which the received image that was not allowed by said determination unit to be held in the memory is removed, as a single image to be provided, and the sending unit sends the single image to be provided held in the memory in response to an image sending request from the another external apparatus.

2. The apparatus according to claim 1, wherein the holding unit functions either when the image sending request is received from the another external apparatus or when the received image to be output by the output unit is changed.

3. An image output system where an image output apparatus and a plurality of image providing apparatuses are connected via a network, said system comprising:

an output unit configured to output at least one received image for displaying, which has been sent from the plurality of image providing apparatuses to the image output apparatus via the network;

a holding unit configured to hold the received image in a memory;

a sending unit configured to send the received image received by the image output apparatus to another said image providing apparatus via the network; and a determining unit configured to inquire the image providing apparatus which provided the received image, for whether or not the received image is allowed to be stored in the memory so as to provide the received image to said another image providing apparatus, and determine whether or not the received image is allowed to be held in the memory by the holding unit based on a response to the inquiry, wherein the output unit outputs a plurality of received images from the plurality of image providing apparatuses as a single screen image, the single screen image includes a received image that was not allowed by said determination unit to be held in the memory;

the holding unit, even when the output unit displays received images from the image providing apparatuses as the single screen image, holds in the memory the single screen image from which the received image that was not allowed by said determination unit to be held in the memory is removed, as a single image to be provided, and the sending unit sends the single image to be provided held in the memory in response to an image sending request from the another image providing apparatus.

4. A control method of an image output apparatus comprising a communication unit configured to communicate with a plurality of external apparatuses via a network, said method comprising:

an output step of outputting at least one received image for displaying, which has been received from one of said external apparatuses that is connected to said image output apparatus via the communication unit;

a holding step of holding the received image in a memory;

a sending step of sending the received image to another said external apparatus via the communication unit; and a determining step of inquiring the external apparatus which provided the received image, for whether or not the received image is allowed to be stored in the memory so as to provide the received image to said another external apparatus, and determining whether or not the received image is allowed to be held in the memory at the holding step based on a response to the inquiry, wherein the output step outputs a plurality of received images from the plurality of external apparatuses as a single screen image, the single screen image includes a received image that was not allowed by said determination unit to be held in the memory;

the holding step, even when the output unit displays received images from the external apparatuses as the single screen image, holds in the memory the single screen image from which the received image that was not allowed by said determination unit to be held in the memory is removed, as a single image to be provided, and the sending step sends the single image to be provided held in the memory in response to an image sending request from the another external apparatus.

* * * * *